(12) United States Patent
Roesch et al.

(10) Patent No.: US 10,393,431 B2
(45) Date of Patent: Aug. 27, 2019

(54) METHOD FOR THE INTEGRATION OF LIQUEFIED NATURAL GAS AND SYNGAS PRODUCTION

(71) Applicant: L'Air Liquide, Societe Anonyme pour l'Etude et l'Exploitation des Procedes Georges Claude, Paris (FR)

(72) Inventors: Alexander Roesch, Katy, TX (US); Alain Guillard, Houston, TX (US); Michael A. Turney, Houston, TX (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 334 days.

(21) Appl. No.: 15/414,100

(22) Filed: Jan. 24, 2017

(65) Prior Publication Data
US 2018/0038643 A1 Feb. 8, 2018

Related U.S. Application Data

(60) Provisional application No. 62/371,497, filed on Aug. 5, 2016.

(51) Int. Cl.
  *C01B 3/34* (2006.01)
  *C01B 3/38* (2006.01)
  (Continued)

(52) U.S. Cl.
  CPC ............... *F25J 1/0231* (2013.01); *C01B 3/34* (2013.01); *C01B 3/384* (2013.01); *C01B 3/56* (2013.01);
  (Continued)

(58) Field of Classification Search
  CPC ......... F25J 1/0231; F25J 1/0232; F25J 1/005; F25J 1/0229; F25J 1/0037; F25J 1/0022;
  (Continued)

(56) References Cited

U.S. PATENT DOCUMENTS

| 2,983,585 A | 5/1961 | Smith |
| 3,347,055 A | 10/1967 | Blanchard et al. |

(Continued)

FOREIGN PATENT DOCUMENTS

| CN | 103 017 480 | 4/2013 |
| CN | 204 063 780 | 12/2014 |

(Continued)

OTHER PUBLICATIONS

International Search Report and Written Opinion for PCT/US2017/045524, dated Nov. 10, 2017.
(Continued)

*Primary Examiner* — Kun Kai Ma
(74) *Attorney, Agent, or Firm* — Justin K. Murray

(57) ABSTRACT

An integrated method for the production of liquefied natural gas (LNG) and syngas is provided. The method can include the steps of: utilizing letdown energy of a high pressure natural gas stream that is withdrawn from a natural gas pipeline to provide a warm temperature cooling; utilizing a refrigeration cycle to provide a cold temperature cooling, wherein the refrigeration cycle comprises a refrigerant recycle compressor that is powered utilizing a steam turbine; and cooling a second high pressure natural gas stream using the warm temperature cooling and the cold temperature cooling to produce an LNG product stream. The second high pressure natural gas stream is withdrawn from the natural gas pipeline, and the steam turbine is powered by high pressure steam that is produced from a syngas production facility.

13 Claims, 3 Drawing Sheets

(51) Int. Cl.
*C01B 3/56* (2006.01)
*F25J 1/00* (2006.01)
*F25J 1/02* (2006.01)

(52) U.S. Cl.
CPC ............ *F25J 1/005* (2013.01); *F25J 1/0022* (2013.01); *F25J 1/0035* (2013.01); *F25J 1/0037* (2013.01); *F25J 1/0052* (2013.01); *F25J 1/0072* (2013.01); *F25J 1/023* (2013.01); *F25J 1/0204* (2013.01); *F25J 1/0229* (2013.01); *F25J 1/0232* (2013.01); *F25J 1/0282* (2013.01); *F25J 1/0288* (2013.01); *F25J 1/0292* (2013.01); *F25J 1/0294* (2013.01); *C01B 2203/0205* (2013.01); *C01B 2203/0233* (2013.01); *C01B 2203/0244* (2013.01); *C01B 2203/042* (2013.01); *C01B 2203/0475* (2013.01); *C01B 2203/0495* (2013.01); *C01B 2203/061* (2013.01); *C01B 2203/1241* (2013.01); *C01B 2203/84* (2013.01); *F25J 2210/06* (2013.01); *F25J 2210/60* (2013.01); *F25J 2230/20* (2013.01); *F25J 2230/30* (2013.01); *F25J 2230/60* (2013.01); *F25J 2240/02* (2013.01); *F25J 2240/04* (2013.01); *F25J 2240/12* (2013.01); *F25J 2240/70* (2013.01); *F25J 2260/60* (2013.01); *F25J 2270/04* (2013.01); *F25J 2270/12* (2013.01); *F25J 2270/16* (2013.01)

(58) Field of Classification Search
CPC ...... F25J 1/0204; F25J 1/0282; F25J 2210/60; F25J 2230/60; F25J 2270/04; C01B 2203/1241
USPC .......................................................... 62/613
See application file for complete search history.

(56) References Cited

U.S. PATENT DOCUMENTS

| | | | |
|---|---|---|---|
| 3,380,809 A | 4/1968 | Newton | |
| 3,446,747 A | 5/1969 | Bongiorno | |
| 3,929,438 A | 12/1975 | Harper et al. | |
| 5,231,835 A | 8/1993 | Beddome et al. | |
| 5,295,350 A * | 3/1994 | Child | F01K 23/068 48/127.3 |
| 6,131,407 A | 10/2000 | Wissolik | |
| 6,196,021 B1 | 3/2001 | Wissolik | |
| 6,298,688 B1 * | 10/2001 | Brostow | F25J 1/0012 62/613 |
| 6,412,302 B1 | 7/2002 | Foglietta | |
| 6,484,533 B1 | 11/2002 | Allam et al. | |
| 6,691,531 B1 * | 2/2004 | Martinez | F25J 1/0282 62/612 |
| 6,694,774 B1 | 2/2004 | Rashad et al. | |
| 6,889,522 B2 * | 5/2005 | Prible | B63B 27/24 62/53.2 |
| 7,243,510 B2 * | 7/2007 | Jones, Jr. | C10L 3/10 60/780 |
| 7,559,213 B2 | 7/2009 | Allam et al. | |
| 2003/0191196 A1 | 10/2003 | Madhubhai et al. | |
| 2004/0129020 A1 * | 7/2004 | Jones, Jr. | C10L 3/10 62/612 |
| 2004/0134196 A1 * | 7/2004 | Jones, Jr. | C10L 3/10 60/772 |
| 2005/0005635 A1 * | 1/2005 | Le Metais | F25J 1/0022 62/612 |
| 2005/0020434 A1 | 1/2005 | Ansorge et al. | |
| 2005/0155382 A1 * | 7/2005 | Ohara | B01D 53/002 62/621 |
| 2006/0260321 A1 | 11/2006 | Minkkinen et al. | |
| 2007/0193303 A1 * | 8/2007 | Hawrysz | C10L 3/10 62/612 |
| 2008/0087863 A1 | 4/2008 | Fisciier et al. | |
| 2009/0301131 A1 * | 12/2009 | Bakker | F25J 1/0279 62/623 |
| 2010/0139317 A1 * | 6/2010 | Chantant | C10L 3/10 62/619 |
| 2010/0175424 A1 * | 7/2010 | Walther | F25J 1/0022 62/612 |
| 2010/0263406 A1 * | 10/2010 | Dam | F25J 1/0022 62/613 |
| 2011/0203313 A1 * | 8/2011 | Huda | C01B 3/12 62/617 |
| 2012/0060553 A1 * | 3/2012 | Bauer | F25J 1/0022 62/614 |
| 2012/0107227 A1 | 5/2012 | Fischer et al. | |
| 2012/0144837 A1 | 6/2012 | Rasmussen et al. | |
| 2012/0151961 A1 * | 6/2012 | Ha | F17C 5/06 62/615 |
| 2013/0074511 A1 * | 3/2013 | Tanaeva | F01D 15/005 60/772 |
| 2013/0139543 A1 * | 6/2013 | Baxter | F25J 3/067 62/611 |
| 2013/0192297 A1 * | 8/2013 | Mak | F25J 1/0022 62/613 |
| 2014/0157822 A1 * | 6/2014 | Turney | F25J 1/0022 62/606 |
| 2014/0157824 A1 * | 6/2014 | Turney | F25J 1/0022 62/613 |
| 2014/0245780 A1 * | 9/2014 | Wyllie | F25J 1/0022 62/613 |
| 2014/0283550 A1 * | 9/2014 | Bonne | F25J 3/04812 62/643 |
| 2014/0352353 A1 * | 12/2014 | Wissolik | F25J 1/0022 62/611 |
| 2015/0233290 A1 | 8/2015 | Lee et al. | |
| 2016/0061516 A1 * | 3/2016 | Seitter | F25J 1/0022 62/612 |
| 2016/0061517 A1 * | 3/2016 | Seitter | F25J 1/0022 62/612 |
| 2016/0061518 A1 * | 3/2016 | Seitter | F25J 1/0022 62/613 |
| 2016/0097589 A1 * | 4/2016 | Turney | F25J 1/0022 62/613 |
| 2016/0216030 A1 | 7/2016 | Truong et al. | |
| 2017/0038132 A1 * | 2/2017 | Guillard | G06Q 10/06313 |

FOREIGN PATENT DOCUMENTS

| | | |
|---|---|---|
| JP | 2002 243360 A | 8/2002 |
| JP | 2004 210 597 | 7/2004 |
| WO | WO 00/57118 | 9/2000 |
| WO | WO 2004/065869 | 8/2004 |

OTHER PUBLICATIONS

International Search Report and Written Opinion for PCT/US2017/045537, dated Nov. 29, 2017.
International Search Report and Written Opinion for PCT/US2017/045544, dated Dec. 12, 2017.
International Search Report and Written Opinion for PCT/US2017/045549, dated Jan. 18, 2018.
International Search Report and Written Opinion for PCT/US2017/045555, dated Oct. 14, 2017.
Geijsel, J.I., et al, "Synergies Between LNG and Gas to Liquids Conversion," International Conference and Exhibition on Liquefied Natural Gas, Jan. 1, 2001.
Coulson, et al., "Carbon Capture Optionsfor LNG Liquefaction," 16th International Conference & Exhibition on Liquefied Natural Gas, pp. 1-17, Apr. 2010.
Syed, M.T., et al, "An Economic Analysis of Three Hydrogen Liquefaction Systems," Int. J. Hydrogen Energy, vol. 23, No. 7, pp. 565-576, 1998.
Bracha, M., et al, "Large-Scale Hydrogen Liquefaction in Germany," Int. J. Hydrogen Energy, vol. 19, No. 1, pp. 53-59, 1994.
Ballout, et al., "Comparison of Present Day Peakshaving Liquefaction Technologies," AICHE Spring Meeting, Natural Gas Utilization Conference, vol. 8, Apr. 2008, pp. 30-47.

(56) References Cited

OTHER PUBLICATIONS

Quack, "Conceptual Design of a High Efficiency Large Capacity Hydrogen Liquefier," Adv. Cryog. Eng., Proc. CEC, Madison 2001, AIP, vol. 613, 255-263—Abstract Only.

\* cited by examiner

METHOD FOR THE INTEGRATION OF LIQUEFIED NATURAL GAS AND SYNGAS PRODUCTION

RELATED APPLICATIONS

This application is a non-provisional application of U.S. Provisional Applicant No. 62/371,497, filed Aug. 5, 2016, which is herein incorporated by reference in its entirety.

TECHNICAL FIELD OF THE INVENTION

The present invention generally relates to a method for efficiently producing liquefied natural gas (LNG). More particularly, the present invention relates to a method for integrating LNG production with a syngas production facility, wherein pressurized steam from the syngas production facility is used to power a steam turbine, which in turn provides power for a recycle compressor of a refrigeration cycle used to liquefy the natural gas.

BACKGROUND OF THE INVENTION

Many locations utilize a high pressure (transmission) network and a lower pressure (distribution) network to supply natural gas through a local area. The transmission network typically acts as a freeway to economically send the gas over long distances to the general area, while the distribution network acts as the roads to send the gas to the individual users within a local area. Pressures of these networks vary by location, but typical values are between 30-80 bara for transmission and 3-20 bara for distribution. Some applications (e.g., cogeneration, boilers, etc . . . ) have high flowrates of natural gas and other utilities such as nitrogen, which are letdown to the consumer or to the lower pressure network at relatively constant flow, pressure and temperature conditions. This pressure letdown energy is often not utilized.

Traditionally, natural gas is compressed and sent through pipelines under high pressure to transport the gas to customers. High pressures are used in order to reduce the volumetric flow of the gas thereby reducing pipe diameters (capex) and/or compression energy related to pressure losses (opex). Pipeline operators also utilize the high pressure as a buffer to accommodate transient demands. When the gas has arrived at its use point, the pressure of the natural gas is reduced in one or more control valves to its final pressure for consumption. The available energy from the reduction in pressure of the natural gas is wasted in the control valves as well as any chilling effect (also known as the Joule Thomson effect) caused by the flow of natural gas through these devices. Additionally, such systems often require heaters and condensate systems due to the colder conditions of the downstream gas.

In the past, advantage has been taken of this wasted energy by facilities utilizing the energy and refrigeration effect of expanding the natural gas. One such facility employed a natural gas pressure reduction station ("Letdown Station") to make liquefied natural gas ("LNG") or liquid nitrogen ("LIN"). A majority of the natural gas entering the plant under high pressure from the transportation pipeline was cooled and sent to an expansion turbine where energy and refrigeration were generated. The remainder of the stream was subsequently cooled with the refrigeration and a portion liquefied. The liquefied portion was then passed to a storage tank as LNG product. The natural gas that was not liquefied was warmed, collected and sent to the low pressure header at a lower pressure than the high-pressure header.

U.S. Pat. No. 6,196,021 describes a system that uses natural gas expansion to provide refrigeration to liquefy a natural gas stream, which is then vaporized by heat exchange with a nitrogen stream to cool the nitrogen stream. This refrigeration supplements refrigeration provided by nitrogen pressure letdown and a nitrogen cycle to provide liquid nitrogen.

Similarly, U.S. Pat. No. 6,131,407 describes a system that produces LIN to be sent directly to an air separation unit ("ASU") to assist refrigeration of the ASU. U.S. Patent Application Publication No. 2014/0352353 describes a similar system to the system of disclosed by U.S. Pat. No. 6,131,407, but adds that the LIN produced can be sent to a tank instead of being used to liquid assist the ASU. In each of these systems, the produced LNG is revaporized in order to provide cooling for the production of liquid nitrogen.

U.S. Pat. No. 6,694,774 describes a system that uses natural gas letdown to provide refrigeration to produce a liquefied natural gas stream, where the refrigeration is supplemented by a closed loop mixed refrigerant cycle. Expansion of the pressurized natural gas provides the "high temperature" cooling and the mixed gas refrigerant cycle provides the low temperature cooling for liquefaction of a second portion of the natural gas. The primary point of emphasis in '774 was to power the compressor of the refrigeration cycle using work generated by the expansion of the pressurized natural gas stream. However, in embodiments in which the gas to be liquefied must be compressed prior to liquefaction, the power used to run the compressor is provided by an electric motor.

Therefore, it would be advantageous to provide a method and apparatus that operated in a more efficient manner yielding a lower cost of LNG.

SUMMARY OF THE INVENTION

The present invention is directed to a method and apparatus that satisfies at least one of these needs. In certain embodiments, the invention can provide a lower cost, more efficient and flexible method to produce LNG.

There is a demand to reduce the cost of liquefying a natural gas stream. In one embodiment of the present invention, a method for producing lower cost liquid natural gas is provided by integrating a syngas production facility, which can include a steam methane reformer (SMR), an autothermal reactor (ATR), or an ATR in combination with the SMR, with the LNG liquefaction unit.

In a typical syngas production facility, excess heat is produced, which is usually converted to high pressure steam. This high pressure steam is letdown in a steam turbine, which drives an electric generator, with the resulting produced electricity being sold back to the grid. Additionally, these syngas production facilities require low pressure natural gas as fuel and high pressure natural gas as process feed, and are typically located near high pressure natural gas pipelines.

Embodiments of the present invention provide for a lower cost LNG by integrating the syngas production facility with a natural gas liquefaction unit. Additionally, in certain embodiments of the invention, the natural gas liquefaction unit utilizes the letdown energy available from the high pressure natural gas in order to provide a portion of the cooling (e.g., warm temperature cooling), while a second portion of the cooling (e.g., cold temperature cooling) is provided by a refrigeration cycle (for example, a nitrogen refrigeration cycle). In certain embodiments, the refrigeration cycle can include a recycle compressor that is directly driven by the steam turbine of the syngas production facility.

A method for the production of liquefied natural gas ("LNG") is provided. In one embodiment, the method can include the steps of: a) operating a syngas production facility that is configured to convert a first natural gas stream into a syngas stream using an endothermic reaction, wherein the endothermic reaction is assisted by burning a second natural gas stream as fuel to provide heat for the endothermic reaction thereby producing a hot flue gas, wherein the hot flue gas is cooled against a pressurized water stream thereby producing pressurized steam, wherein the pressurized steam is fed to a steam turbine; b) cooling and liquefying a third natural gas stream using refrigeration provided by at least two different sources to produce an LNG product stream; c) providing a first source for the refrigeration used in step b) by expanding the second natural gas stream in a natural gas expander and then warming the second natural gas stream, prior to being burned as fuel in step a), against the third natural gas stream; and d) providing a second source for the refrigeration used in step b) using a nitrogen refrigeration cycle, wherein the nitrogen refrigeration cycle comprises a nitrogen recycle compressor and at least one turbine, and at least one booster, wherein the at least one turbine is configured to power the at least one booster, wherein the nitrogen recycle compressor is at least partially driven by the steam turbine of the syngas production facility.

In optional embodiments of the method for the production of LNG:
  the first natural gas stream, the second natural gas stream, and the third natural gas stream all originate from a common source, wherein the common source is a pressurized natural gas pipeline;
  the nitrogen refrigeration cycle comprises the steps of compressing nitrogen refrigerant in the nitrogen recycle compressor, further compressing the nitrogen refrigerant in the at least one booster, cooling the nitrogen refrigerant in the heat exchanger, withdrawing the nitrogen refrigerant from an intermediate portion of the heat exchanger and then expanding the nitrogen refrigerant in the at least one turbine to produce a cold nitrogen refrigerant; and warming the cold nitrogen refrigerant against the third natural gas stream;
  the second natural gas stream is warmed against the third natural gas stream in a first heat exchanger and the nitrogen refrigerant is warmed against the third natural gas stream in a second heat exchanger;
  the first heat exchanger and the second heat exchanger are disposed within one heat exchanger unit;
  the outlet temperature of the natural gas turbine is warmer than the temperature at the outlet of the at least one turbine of the nitrogen refrigeration cycle;
  the first source for the refrigeration is provided in step c) at a first temperature, wherein the second source for the refrigeration is provided in step d) at a second temperature, wherein the second temperature is colder than the first temperature;
  the first source for the refrigeration provided in step c) and the second source for the refrigeration provided in step d) are provided without using externally provided electricity;
  the refrigeration used to liquefy the third natural gas stream during step b) is produced without the use of externally provided electricity;
  the refrigeration used to liquefy the third natural gas stream during step b) is produced with reduced amounts of externally provided electricity;
  the second natural gas stream and the third natural gas stream are boosted in a natural gas booster prior to steps b) and c);
  the natural gas expander comprises a natural gas expansion turbine; and/or
  the natural gas turbine powers the natural gas booster.

In another embodiment, the method for the production LNG can include the steps of: utilizing letdown energy of a high pressure natural gas stream that is withdrawn from a natural gas pipeline to provide a warm temperature cooling; utilizing a refrigeration cycle to provide a cold temperature cooling, wherein the refrigeration cycle comprises a refrigerant recycle compressor that is powered utilizing a steam turbine, wherein the steam turbine is powered by high pressure steam, wherein the high pressure steam is produced from a syngas production facility; and cooling a second high pressure natural gas stream using the warm temperature cooling and the cold temperature cooling to produce an LNG product stream, wherein the second high pressure natural gas stream is withdrawn from the natural gas pipeline.

In optional embodiments of the method for the production of LNG:
  the natural gas pipeline is operated at a pressure between 15 and 100 bara; and/or
  the refrigeration cycle is selected from the group consisting of a nitrogen refrigeration cycle and a mixed refrigerant refrigeration cycle.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In one embodiment, the method can include integrating a natural gas letdown system with a refrigeration cycle (e.g., nitrogen, mixed refrigerant) and a syngas production facility. In one embodiment, the refrigeration cycle is a closed loop refrigeration cycle. In this embodiment, the natural gas letdown essentially provides "free" refrigeration energy since the natural gas would have been alternatively letdown across a valve (i.e., the resulting drop in temperature of the natural gas would have been absorbed by the surroundings and would not have been recovered in any meaningful way). With the addition of a natural gas turbine booster, LNG can be co-produced with a significant power savings, while also potentially reducing the size of the nitrogen refrigeration cycle. In another embodiment, a purification unit, storage, loading and utility systems may also be included. In another embodiment, the natural gas that is letdown is provided to a syngas production facility (SPF) (e.g., SMR, ATR, ATR+ SMR, etc . . . ), which in turn produces excess steam that is used to drive a steam turbine, which can then power the recycle compressor of the refrigeration cycle.

Figure 1:
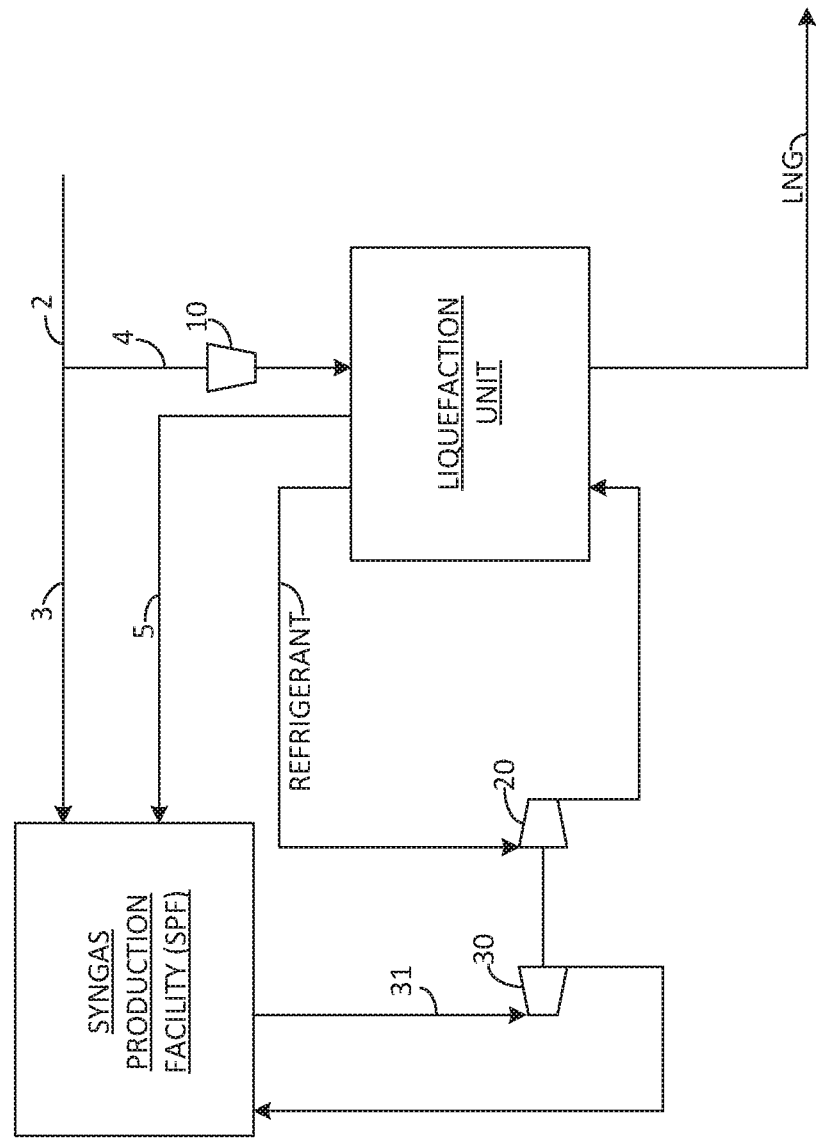
FIG. 1 provides an embodiment of the present invention.

Referring to FIG. 1, a process flow diagram of an embodiment of the current invention is shown. In FIG. 1, high pressure natural gas 2 is preferably split into two portions, with one portion being sent to the syngas production facility (e.g., SMR) for use as process gas 3. Second portion of high pressure natural gas 4 is optionally purified in a purification unit (not shown) in order to remove water and carbon dioxide according to methods known heretofore. Following purification, the second portion 4 can then be pressurized in natural gas compressor 10 prior to being sent to the natural gas liquefaction unit. Within natural gas liquefaction unit, a portion of the natural gas is liquefied to produce LNG. Another portion of natural gas is withdrawn from the liquefaction unit as a low pressure, warm natural gas stream, which is subsequently provided to the SMR for use as fuel 5.

In the embodiment shown, refrigeration for the liquefaction unit is provided by two primary sources. The first source can be a refrigeration cycle in which a refrigerant is compressed in refrigerant recycle compressor 20 before refrigerant is expanded to provide the cold temperature cooling. The second source of refrigeration can be provided by using the excess pressure differential of the high pressure natural gas which is used as fuel in the burners of the SMR.

Advantageously, embodiments of the present invention provide for reduced costs by using at least a portion of the high pressure steam produced by the SMR to turn steam turbine 30, which directly powers refrigerant recycle compressor 20, preferably via a common shaft or gearbox.

Figure 2:
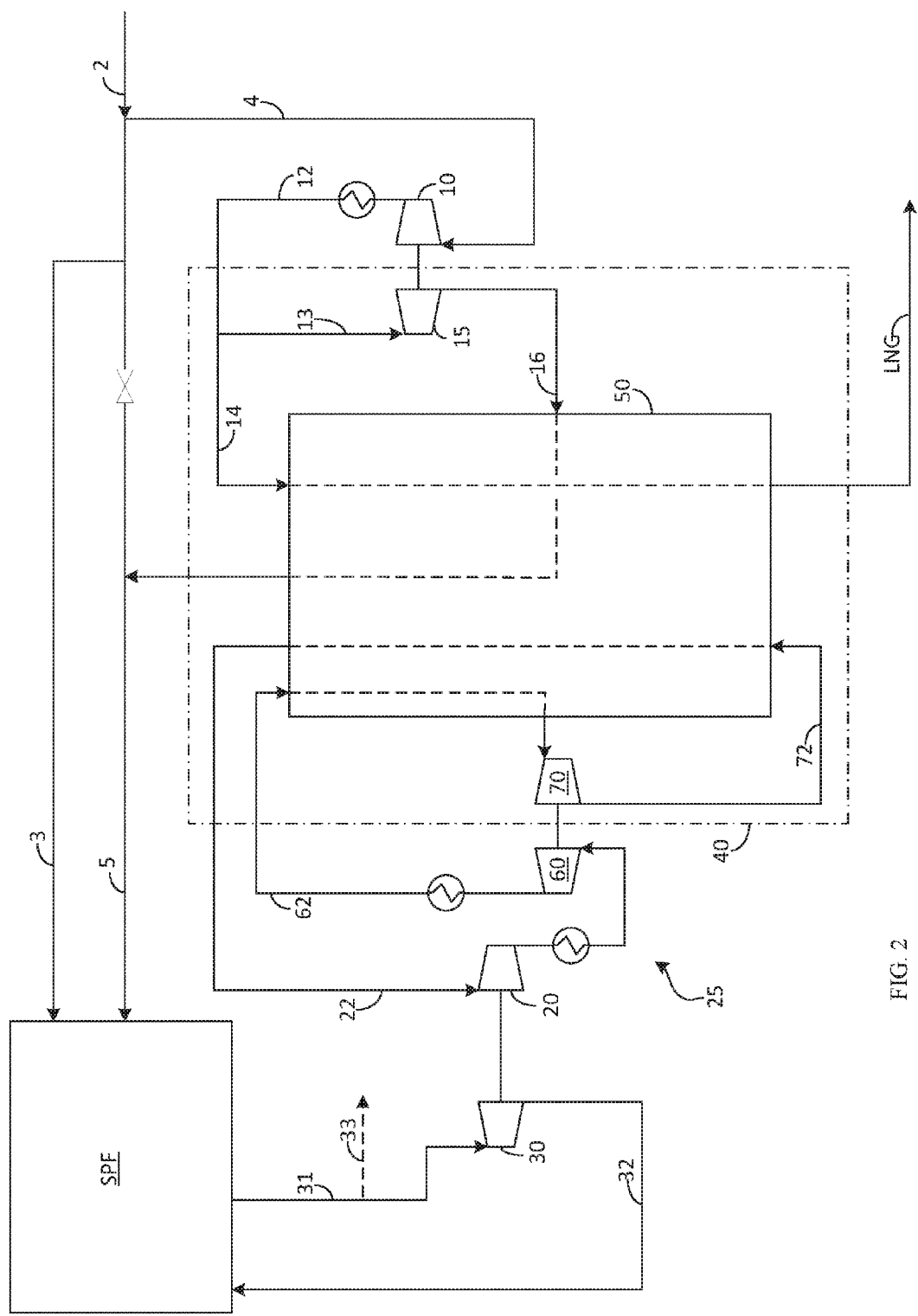
FIG. 2 provides an additional embodiment of the present invention.

FIG. 2 provides another embodiment of the present invention with more detail pertaining to the liquefaction unit. In this embodiment, high pressure natural gas 2 is again split into process gas 3, which is sent to syngas production facility (SPF), and second portion of high pressure natural gas 4, which is sent to the cold box 40 of liquefaction unit. Second portion of high pressure natural gas 4 can be pressurized in natural gas compressor 10 and cooled in aftercooler to produce second pressurized natural gas stream 12, which can then be split into two streams. First portion 13 can be expanded in natural gas expander 15 to produce expanded natural gas stream 16, which is then warmed in heat exchanger 50 and subsequently sent to the burners of the SMR for use as fuel. Second portion 14 can then be sent to heat exchanger 50 for cooling and liquefying therein to produce LNG product stream. Natural gas expander 15 is preferably connected with natural gas compressor 10 via a common shaft, thereby providing the compressing energy used by natural gas compressor 10.

Refrigeration cycle 25 can include compressing low pressure refrigerant 22 in refrigerant recycle compressor 20 and further boosting in one or more refrigerant boosters 60 to produce pressurized refrigerant. Pressurized refrigerant 62 can then be partially cooled in heat exchanger 50 prior to being expanded in one or more refrigerant expanders 70 to produce expanded refrigerant 72, which is used to provide the cold temperature cooling for the liquefaction unit by exchanging heat with second portion 14 within heat exchanger 50 to produce low pressure refrigerant 22. Refrigerant expander(s) is/are preferably connected with refrigerant booster(s) via a common shaft, thereby providing the compressing energy used by the refrigerant booster(s) 60.

Within the SPF, high pressure steam 31 is produced, which at least a portion can then be used to drive steam turbine 30 to produce low pressure steam 32, which is then recycled back to the SMR. Steam turbine 30 is preferably connected with refrigerant recycle compressor 20 via a common shaft or gear box, thereby providing the compressing energy used by refrigerant recycle compressor 20. In an optional embodiment, a portion of steam 33 can be used for other purposes.

Figure 3:
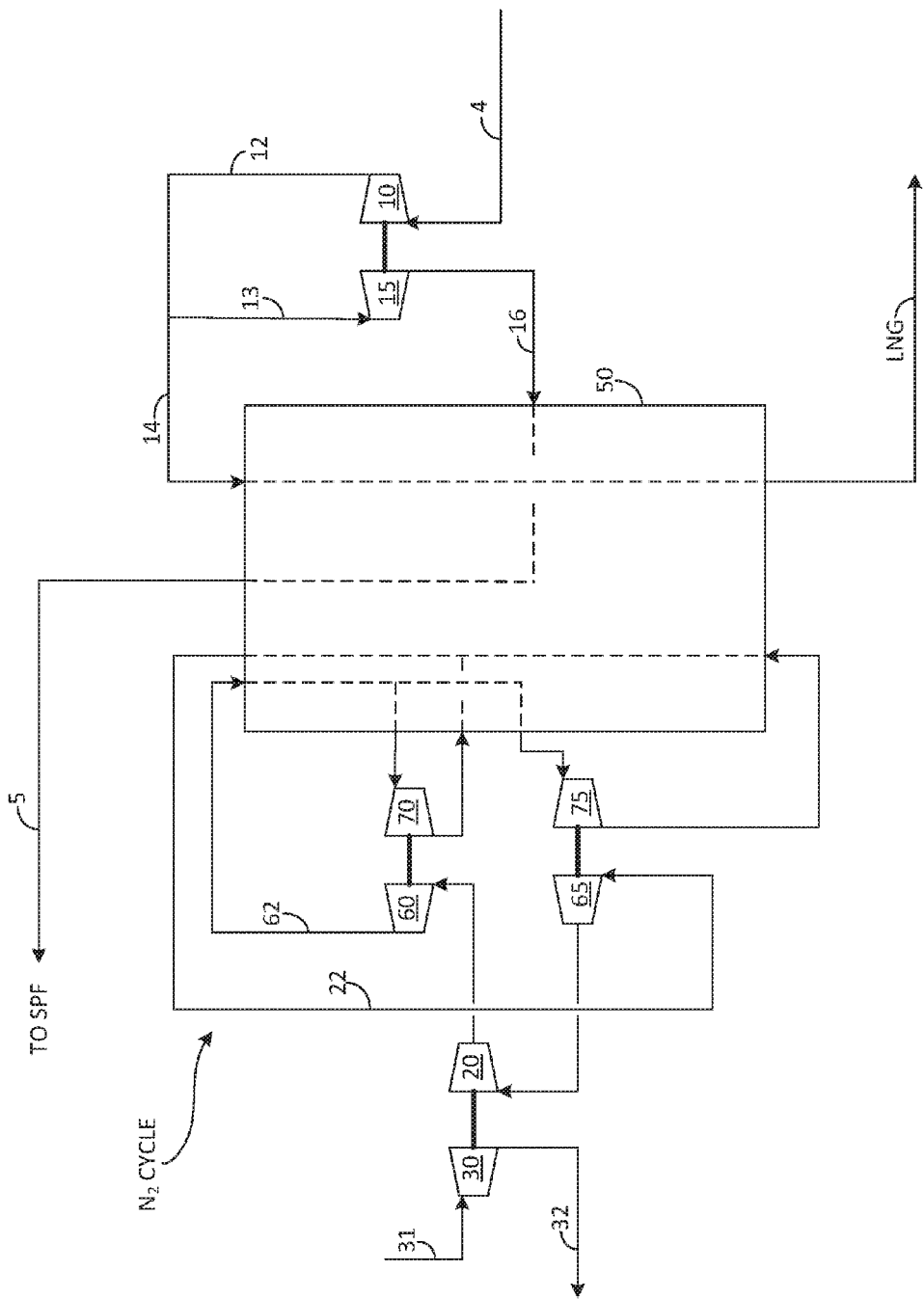
FIG. 3 provides yet another embodiment of the present invention.

FIG. 3 provides another embodiment of the present invention that includes experimental data. In this embodiment, approximately 23,550 NM$^3$/hr of natural gas at 35 bara is compressed in natural gas compressor 10 to a pressure of about 46 bara. Approximately 6000 NM$^3$/hr is then expanded to about 4 bara in natural gas expander 15 to produce approximately 273 kW of work (which powers natural gas compressor 10). The resulting expanded natural gas is then warmed in heat exchanger 50 and used as fuel in the SMR. The remaining 17,550 NM$^3$/hr of pressurized natural gas is then cooled and liquefied in heat exchanger 50 to produced approximately 329 MTD of LNG at 1.08 bara and −166.5° C. In another embodiment (not shown), the pressurized natural gas may be removed from heat exchanger 50, at an intermediate temperature (e.g., −30° C. to −90° C.) in order to remove the condensed heavy hydrocarbons or NGL production. The remaining vapor can then be reintroduced to heat exchanger 50 at the intermediate point for further cooling and liquefaction.

The cold temperature refrigeration for the system is provided by a nitrogen refrigeration cycle using a flow of 93,000 NM$^3$/hr of nitrogen. The low pressure refrigerant is at about 5.7 bara before it is compressed in first refrigerant compressor 65 to a pressure of about 6.9 bara. From there, the refrigerant is further compressed in refrigerant recycle compressor 20 to a pressure of about 28 bara, and then further compressed in second refrigerant compressor 60 to a pressure of about 48 bara. From there, the pressurized refrigerant is partially cooled in heat exchanger 50, and split into two streams that are then expanded in first and second refrigerant expanders 70, 75, which are used to power first and second refrigerant compressors 60, 65, respectively. Following expansion, the produced cold refrigerant streams are reintroduced to the heat exchanger 50 to provide refrigeration therein for liquefaction of the natural gas.

In the embodiment shown, zero external energy is used to power the compressors (10, 20, 70, 75). This results in a significant cost savings over those methods and systems described in the prior art. For example, in methods known heretofore, steam turbine 30 would drive an electric generator such that electricity is produced to the electrical grid from the steam letdown. This requires an expensive electrical system and often a low value for the electricity produced.

Those of ordinary skill in the art will recognize that other types of refrigeration cycles may be used. Therefore, embodiments of the invention are not intended to be limited to the particular refrigeration cycles shown and described within the detailed specification and in the accompanying figures. For example, the arrangement of compressors 20, 60, and 65 may be such that compressor 20 is located either before or after both compressors 60 and 65. Alternatively nitrogen refrigeration cycle 25 may be replaced by a mixed refrigerant cycle without turbine boosters 70-60, and 75-65.

As used herein, refrigeration that is produced "without the use of externally provided electricity" is to mean that any recycle compressors and boosters that may be used in a particular refrigeration source are not powered by an electrical motor. It is understood that various ancillary electrical loads such as lube oil pumps, cooling systems, etc. may still be required.

As used herein, refrigeration that is produced "with reduced amounts of externally provided electricity" is to mean that any recycle compressors and boosters that may be used in a particular refrigeration source use less electricity than if they were powered solely by an electrical motor.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. A method for a production of liquefied natural gas ("LNG"), the method comprising the steps of:
   a) operating a syngas production facility that is configured to convert a first natural gas stream into a syngas stream, wherein the syngas production facility is further configured to produce a pressurized steam, wherein the pressurized steam is fed to a steam turbine, wherein during said operating step, the syngas production facility uses a second natural gas stream at a lower pressure than the first natural gas stream;
   b) cooling and liquefying a third natural gas stream using refrigeration provided by at least two different sources to produce an LNG product stream;
   c) providing a first source for the refrigeration used in step b) by expanding the second natural gas stream in a natural gas expander and then warming the second natural gas stream, prior to being used in the syngas production facility in step a), against the third natural gas stream; and
   d) providing a second source for the refrigeration used in step b) using a nitrogen refrigeration cycle, wherein the nitrogen refrigeration cycle comprises a nitrogen recycle compressor and at least one turbine, wherein the nitrogen recycle compressor is driven by the steam turbine of the syngas production facility.

2. The method as claimed in claim 1, wherein the first natural gas stream, the second natural gas stream, the second natural gas stream, and the third natural gas stream all originate from a common source, wherein the common source is a pressurized natural gas pipeline.

3. The method as claimed in claim 1, wherein the nitrogen refrigeration cycle comprises the steps of compressing nitrogen refrigerant in the nitrogen recycle compressor, further compressing the nitrogen refrigerant in at least one booster, cooling the nitrogen refrigerant in a heat exchanger, withdrawing the nitrogen refrigerant from an intermediate portion of the heat exchanger and then expanding the nitrogen refrigerant in the at least one turbine to produce a cold nitrogen refrigerant; and warming the cold nitrogen refrigerant against the third natural gas stream.

4. The method as claimed in claim 1, wherein the second natural gas stream is warmed against the third natural gas stream in a first heat exchanger and the nitrogen refrigerant is warmed against the third natural gas stream in a second heat exchanger.

5. The method as claimed in claim 4, wherein the first heat exchanger and the second heat exchanger are disposed within one heat exchanger unit.

6. The method as claimed in claim 1, wherein an outlet temperature of the natural gas turbine is warmer than a temperature at an outlet of the at least one turbine of the nitrogen refrigeration cycle.

7. The method as claimed in claim 1, wherein the first source for the refrigeration is provided in step c) at a first temperature, wherein the second source for the refrigeration is provided in step d) at a second temperature, wherein the second temperature is colder than the first temperature.

8. The method as claimed in claim 1, wherein the first source for the refrigeration provided in step c) and the second source for the refrigeration provided in step d) are provided without using externally provided electricity.

9. The method as claimed in claim 1, wherein the refrigeration used to liquefy the third natural gas stream during step b) is produced without the use of externally provided electricity.

10. The method as claimed in claim 1, wherein the refrigeration used to liquefy the third natural gas stream during step b) is produced with reduced amounts of externally provided electricity.

11. The method as claimed in claim 1, wherein the second natural gas stream and/or the third natural gas stream are boosted in a natural gas booster prior to steps b) and c).

12. The method as claimed in claim 11, wherein the natural gas expander comprises a natural gas expansion turbine.

13. The method as claimed in claim 12, wherein the natural gas expansion turbine powers the natural gas booster.

* * * * *